United States Patent [19]

Werner et al.

[11] Patent Number: 5,069,836
[45] Date of Patent: Dec. 3, 1991

[54] METHOD OF REPAIRING WINDSHIELD BREAKS

[75] Inventors: Frank D. Werner; Richard C. Greig, both of Jackson, Wyo.

[73] Assignee: Frank D. Werner, Jackson, Wyo.

[21] Appl. No.: 389,615

[22] Filed: Jul. 28, 1989

[51] Int. Cl.[5] .............................................. B32B 35/00
[52] U.S. Cl. ........................................ 264/36; 156/94; 264/35; 425/12; 425/13; 427/140
[58] Field of Search ................................ 264/36, 31–35; 156/94; 425/11–13; 427/140, 142; 249/175, 177, 216, 217; 29/402.18, 402.19, 402.09

[56] References Cited

U.S. PATENT DOCUMENTS

| | | | |
|---|---|---|---|
| 3,562,366 | 2/1971 | Sohl | 264/36 X |
| 3,993,520 | 11/1976 | Werner et al. | 156/94 |
| 4,032,272 | 6/1977 | Miller | 264/36 X |
| 4,047,863 | 9/1977 | McCluskey et al. | 425/13 |
| 4,132,516 | 1/1979 | Story | 264/36 X |
| 4,200,478 | 4/1980 | Jacino et al. | 264/36 X |
| 4,249,869 | 2/1981 | Petersen | 264/36 X |
| 4,280,861 | 7/1981 | Schwartz | 425/13 X |
| 4,385,015 | 5/1983 | Klettke | 264/36 |
| 4,385,879 | 5/1983 | Wilkinson | 264/36 X |
| 4,419,305 | 12/1983 | Matles | 264/36 |
| 4,597,727 | 7/1986 | Birkhauser, III | 425/12 |
| 4,681,520 | 7/1987 | Birkhauser, III | 425/12 |
| 4,744,841 | 5/1988 | Thomas | 156/73.6 |

Primary Examiner—Jan H. Silbaugh
Assistant Examiner—Karen Aftergut
Attorney, Agent, or Firm—Kinney & Lange

[57] ABSTRACT

A method for repairing breaks in safety glass, such as that found on automotive windshields, includes as an apparatus a self-contained, small fixture which can be secured to the windshield and centered on the break. The fixture includes connections for applying a vacuum source for evacuating the break, and for connecting a self-contained and self-supported measured quantity of resin to the fixture so that resin will enter the break while the break remains under a vacuum. The introduction of the resin into the break is thus enhanced, because the break is under vacuum. When vacuum is released, pressure may be applied to the resin to force it into the break to completely fill the break and provide for a visually acceptable repair. Curing of resins can then be carried out in a conventional manner.

14 Claims, 7 Drawing Sheets

METHOD OF REPAIRING WINDSHIELD BREAKS

BACKGROUND OF THE INVENTION

1. Field of the Invention

The present invention relates to an in-place repair device for repairing glass panes, such as automobile windshields, and a method of using the device.

2. Description of the Prior Art

U.S. Pat. No. 3,993,520, to Werner et al., discloses the filling of a windshield crack utilizing a bridge member mounted on the windshield and injecting a resin in a cycle using both positive and negative pressures developed with a threaded injector assembly. The apparatus works very well, and a variety of additional types of windshield repair units have been subsequently advanced. An entire industry for repairing windshield cracks, particularly small cracks, has arisen, and has been pioneered and operated worldwide by Novus Inc., of Minneapolis, Minn., using the Werner et al device.

The repairs have been widely accepted as alternatives to replacement of entire windshields, thus providing for a substantial savings to consumers throughout the world.

The apparatus in U.S. Pat. No. 3,993,520 requires a separate addition of resin, and the positioning of the injector using a separate bridge which is held in place with vacuum cups. The present invention relates to improvements comprising a modular repair assembly that is completely disposable and requires less time for completing and obtaining uniform quality.

In addition to U.S. Pat. No. 3,993,520, windshield repair systems which utilize resin injected into a break using various bridges and injection apparatus have been advanced. Many such devices use a separate vacuum pump, either hand or motor operated, that is connected to a fitting and, after a repair material, such as a resin, has been injected into the windshield break through the fitting, a vacuum is applied to the break and the resin injected, with a subsequent cycle of positive pressure over the windshield break to force the resin repair material into the windshield break. Such apparatus is shown in U.S. Pat. No. 4,597,727, for example and devices which use an external vacuum pump also are shown in U.S. Pat. Nos. 4,047,863 and 4,419,305.

A device substantially similar to U.S. Pat. No. 4,597,727 is disclosed in U.S. Pat. No. 4,681,520, which also utilizes a separate vacuum pump and provides a different type of fixture for solving problems that have arisen with the fixture in relation to curved windshields. U.S. Pat. No. 4,032,272 discloses evacuating a break before resin is admitted to it.

A manual device for injecting resins into a crack in glass is illustrated in U.S. Pat. No. 4,744,841. This also uses a vacuum cup holder, and a pump for evacuating the cup.

The costs of supplies are relatively low for windshield repair, and the major cost is attributable to labor, including time of transit and of making the repair. Thus, simplification that reduces time spent, and time cleaning up, provides significant advantages in the marketplace.

Also, minimizing the number of parts that one must keep track of simplifies the task of the repair person, as well as reducing the volume and weight of the equipment that has to be carried for repairs.

SUMMARY OF THE INVENTION

The present invention relates to a windshield repair device that comprises a fixture which mounts over a break in a glass panel, such as a windshield, and which is self-contained in that it includes a container or chamber having a measured amount of resin useful for repairing such breaks. The device is held on the windshield surface, preferably utilizing double sided adhesive tape, with an opening in the fixture overlying the break surrounded by a sealing lip or edge that will prevent resin from leaking out along the windshield surface. The container or chamber in which the resin can be stored has a sealed opening leading to a channel to which a vacuum pump is attached and which also leads to the opening in the fixture. The resin chamber can be positioned so that resin will not enter the opening that leads to the break until a desired time in the cycle. After the fixture is mounted and the vacuum has been applied, the resin chamber can be emptied, either by gravity upon moving the container to a suitable position, or by compressing the container using a plier or other tool, to cause the resin to flow into the channel leading to the break while the gap between the break parts and the channel remain under vacuum. The resin will flow into the gap of the break. Thereafter the vacuum can be removed so that atmospheric pressure will act on the resin to force it into portions of the break which were evacuated.

As a preferred alternative, air pressure can then be provided to the channel leading to the break to apply pressure greater than atmospheric to force the resin into the remote corners of the break for a visually perfect repair, without any significant air or other gas bubbles. The pressures can be controlled to prevent any further separation of the glass layers forming a laminated windshield, which can result if excessive pressure is applied. In fact, pressure may be applied by any gas or liquid other than air, so long as the gas or liquid is adequately compatible with the materials it contacts.

Specifically, the device comprises a fixture with a flange having a central opening that surrounds the break. The fixture is secured to the windshield surface. The resin channel leading to the central opening of the flange is oriented in a manner to permit visual inspection of the break, prior to fixing the flange in position and during the injection of resin, for ease of repair.

Once the resin has been injected and a sufficient time has passed (or a cure treatment carried out) for at least a partial cure, the fixture is removed from the windshield, and can be disposed of.

The only resin remaining on the windshield will be a small amount surrounding the break that is inside the central opening of the flange, which can then be scraped off with a razor blade or otherwise removed. The resin may be of the type that needs to be cured utilizing ultraviolet light. The fixture is made of material, at least in a portion overlying the break, which will pass UV light, so that the curing can take place prior to removal of the fixture. While resins which can be cured by UV light are fairly well known, it is possible to use resins which can be cured by light outside of the UV spectrum. The term "UV light" means to include light anywhere in the spectrum. Also, simple exposure to sunlight is a reasonable, though usually less convenient, substitute for a UV lamp.

Additionally, drying out the break before putting the fixture in place forms an important portion of the process. Prior to placing the fixture over the break, it is desirable to dry the break to make sure that all liquid water has been removed from the gap of the break.

DESCRIPTION OF THE PREFERRED EMBODIMENTS

Figure 1:
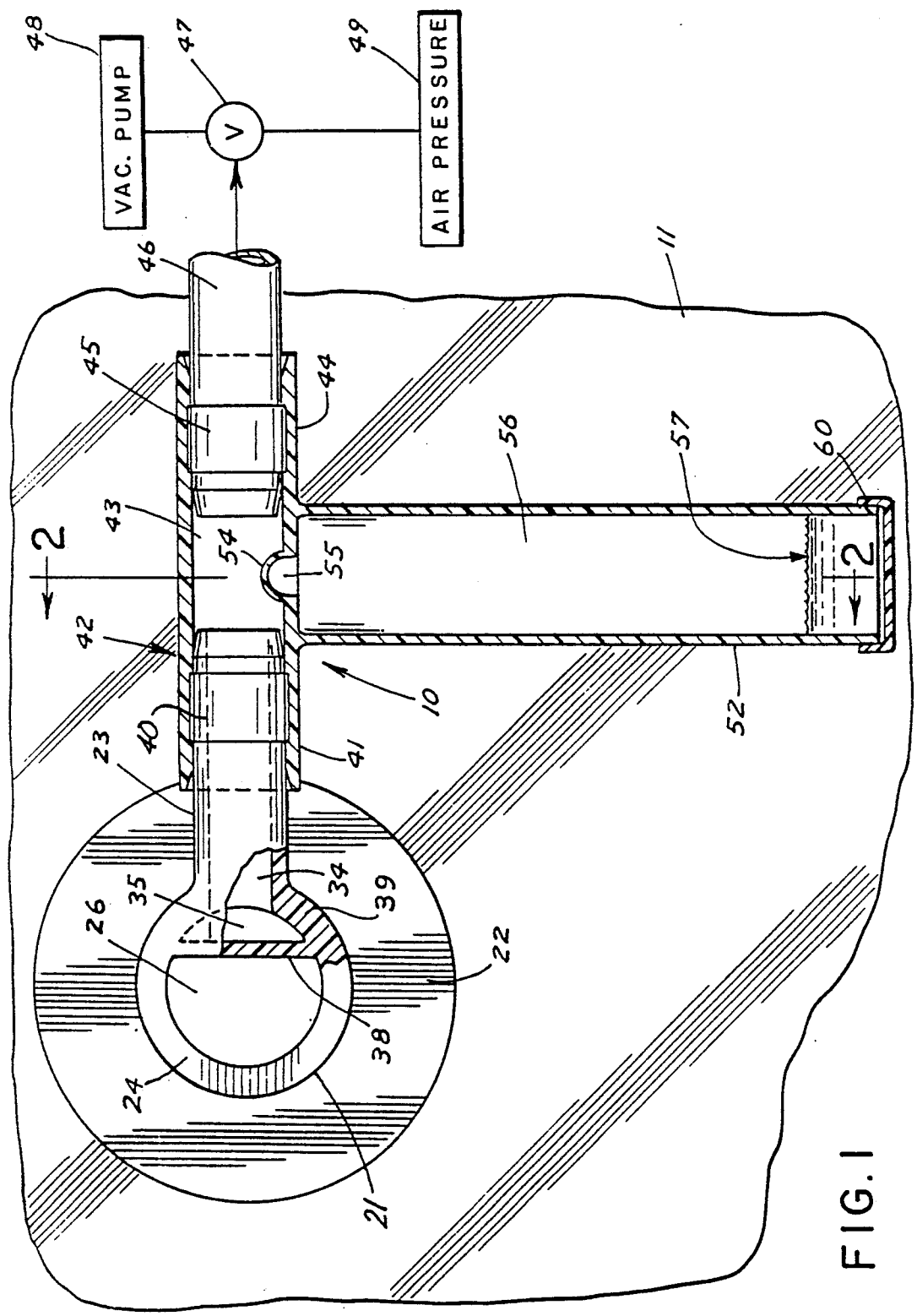
FIG. 1 is a top view of a repair device of the present invention shown installed on a windshield, with parts in section and parts broken away.
Figure 2:
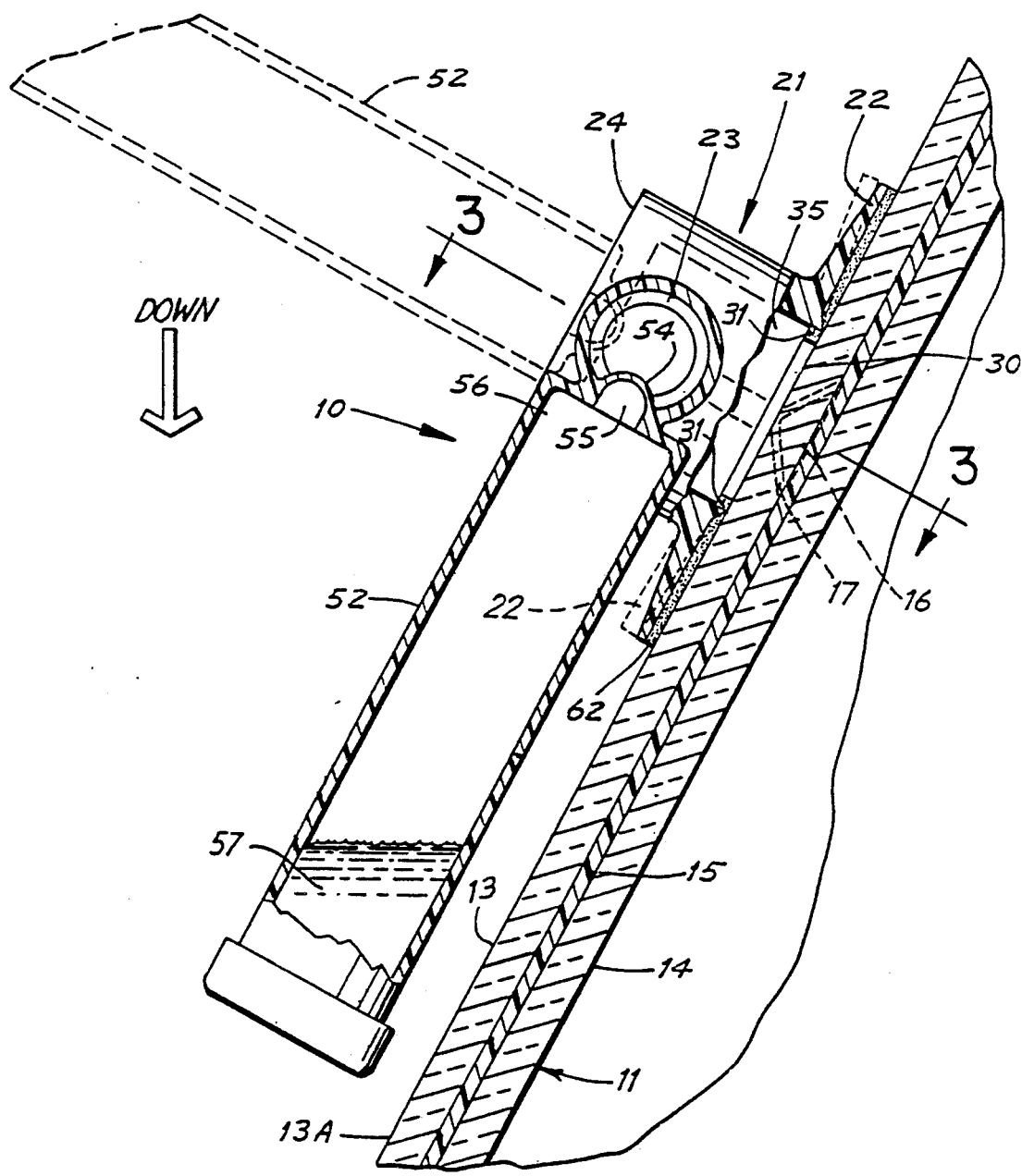
FIG. 2 is a sectional view taken generally along line 2—2 in FIG. 1.
Figure 3:
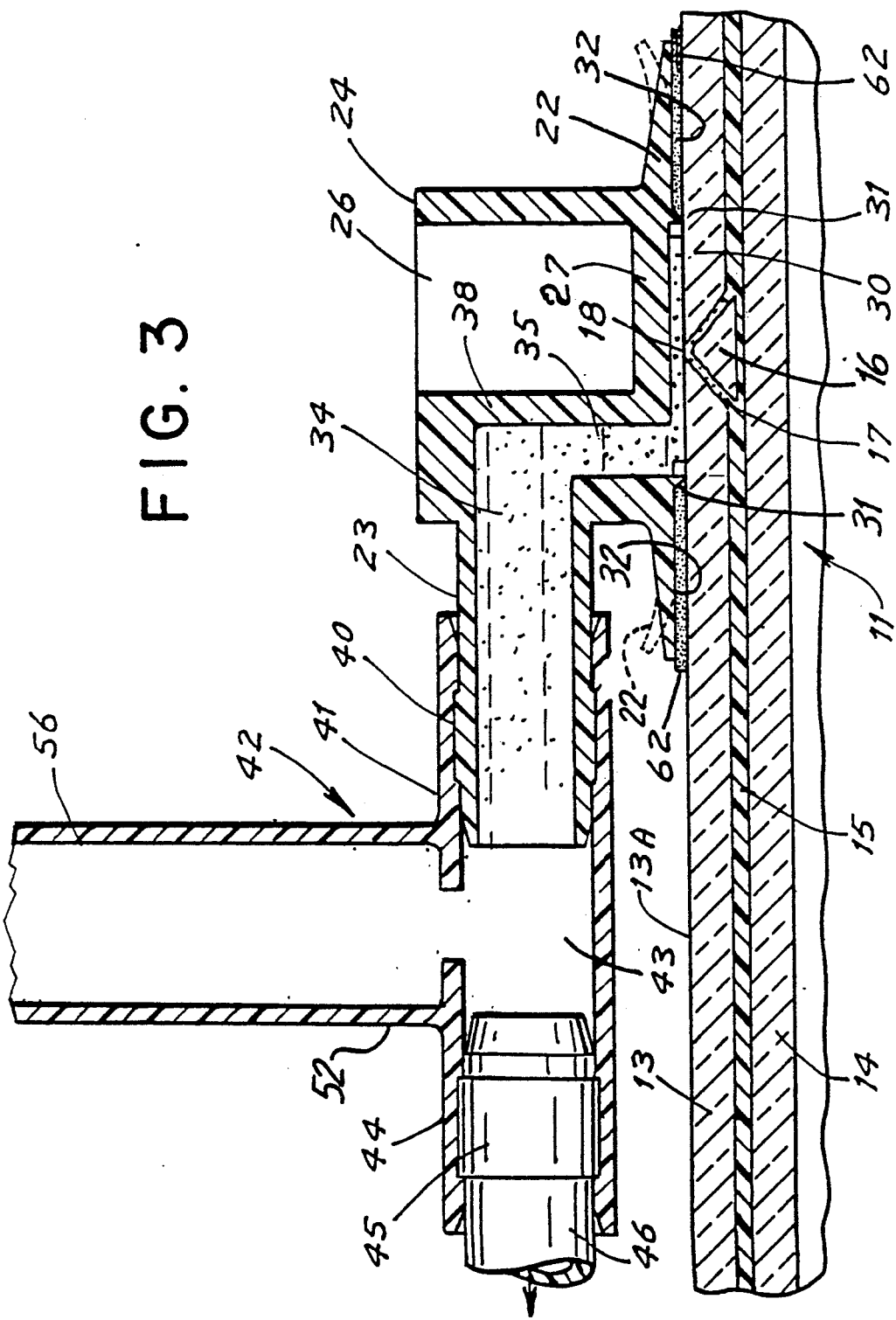
FIG. 3 is a sectional view taken as on line 3—3 in FIG. 2 with a resin storage chamber in a position to permit flow of resin to a crack.
Figure 3A:
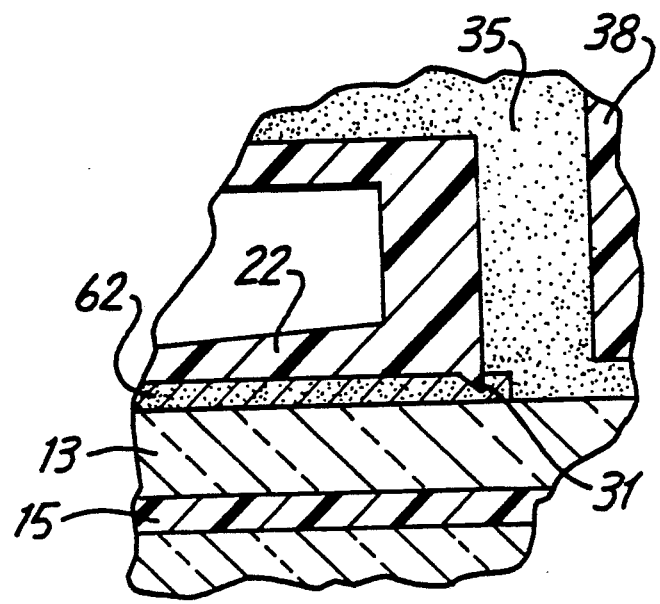
FIG. 3A is a fragmentary enlarged view of a seal arrangement shown in FIG. 3.

In FIG. 1, a repair fixture indicated generally at 10 is mounted onto a windshield segment 11 of conventional design, which is laminated glass as shown in FIG. 2, and (referring to FIG. 2) includes a first outer layer 13 of glass, a second glass layer 14, and a center layer 15 which is a suitable safety material that is somewhat compressive, so that when a stone hits the windshield the center layer 15 will compress to form a bull's eye break 16, generally as shown in FIGS. 2 and 3. This bull's eye break causes a cone of glass to shear out of place and compress the center layer 15. An air gap indicated at 17 is formed along the sides of the generally cone shaped glass piece, with an entrance hole 18 leading into the air gap 17.

Often, a break will happen which is called a "star break." In this case, cracks form in the glass such that the breaks are generally perpendicular to the surface of the glass and several such breaks usually radiate outward a short distance from the point of impact. These cracks almost always extend down to center layer 15. They are very rarely found in second glass layer 14, being essentially cracks in layer 13 as in the case of bull's eye breaks. In this discussion repair is discussed for bull's eye breaks, but the discussion and the operation of the disclosed process is essentially the same for star breaks, and for combination breaks which are partly star breaks and partly bull's eye breaks.

Fixture 10 in FIG. 2 has two main parts, a main body 21 which includes a base housing, and a reservoir housing 52 for liquid resin. Preferably, these are injection molded of semi-flexible thermoplastic for reasons which are made clear later. Base housing 24 has an annular support flange 22 at the lower end thereof. An integral tube coupling nipple 23 extends laterally from base housing 24. The flange 22 is held against the windshield during use. The base housing 24 has an interior recess 26 that is open to the top, as shown in FIG. 3, in particular, and also in FIG. 1. The recess is part cylindrical and forms a wall portion 27 that is directly above a resin chamber or receptacle 30 which is formed on the lower side of wall 27. The resin chamber 30 is surrounded by a generally sharp sealing edge 31 formed on a tapered annular lower surface 32 of the flange 22. The edge 31 circumscribes the chamber 30 to provide a seal around the chamber.

The nipple 23 defines an interior passageway 34 which extends into the side wall of the support housing. Passageway 34 opens to a connecting passageway 35 and provides a fluid connection between the passageway 34 and the resin chamber 30. The cross section of opening 35 is a segment of a circle, as can generally be seen in FIG. 1 and is defined on its inner side by a wall portion 38 and by an outer edge wall 39.

The nipple 23 has a raised annular rib or flange 40 that is used to form a flexible connection comprising a rotating joint in connection with a connector sleeve 41 of a reservoir body adapter assembly 42. The sleeve 41 has an internal groove that fits over the raised rib 40, to lock the nipple 23 and the sleeve 41 together axially, but still permit the sleeve to rotate or move about the axis of the nipple 23.

The reservoir body adapter assembly 42 has an internal passageway 43 defined therein opening to the passageway 34, and at an outer end of the assembly 42, a second sleeve 44 is formed to align with the sleeve 41. Second sleeve 44 is substantially a mirror image of sleeve 41 and receives a raised rib 45 of a line or tube 46 that is connected through a valve 47 selectively to either a vacuum pump 48 or a suitable hand pump or other air pressure source indicated at 49. A suitable grease is used in the joints formed by rib 40 and the groove in sleeve 41 and by rib 45 and the groove in sleeve 44, to eliminate vacuum or pressure leakage at such joints. This is also true in similar joints in the embodiments shown in the other figures. Such grease is preferable applied at the factory so it need not be done in the field.

Figure 4:
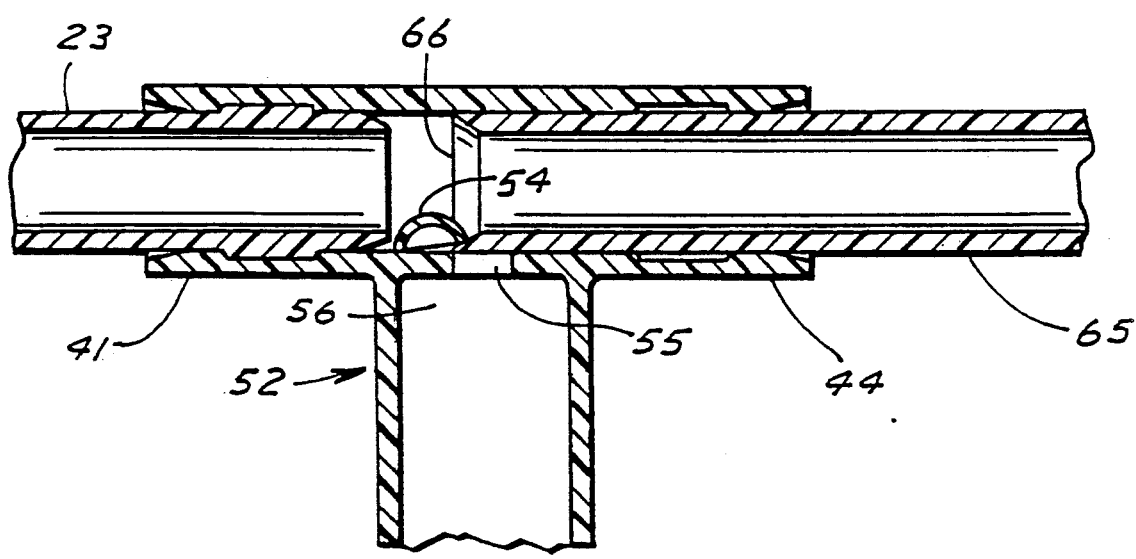
FIG. 4 is a fragmentary enlarged view illustrating a method of opening a reservoir for resin used with the present invention.

Resin reservoir housing 52 is integrally molded with the two sleeves 41 and 44, and extends laterally therefrom. The housing 52 is a cylindrical chamber and includes as shown in figures 1, 2 and 4 a hemispherical, bulb-like, end seal cap or closure member indicated at 54 protruding into the passageway 43, in which the nipples 46 and 23 are positioned.

This cap member 54 protrudes outwardly and has a hollow interior that defines a cap overlying an opening indicated at 55 through the main wall portion of the reservoir body adapter assembly 42.

Seal cap closure member 54 forms a frangible or rupturable member for the opening 55 which opens a passageway into the interior 56 of the resin reservoir 52. The resin reservoir 52 contains a small amount of a suitable resin, that has a suitable index of refraction, and which is indicated at 57. The outer end of the reservoir 52 can be sealed with a suitable cap 60 or with a heat seal or sonic weld.

The support flange 22 is secured to the outer surface 13A of the glass or windshield 11 with a suitable ring of double sided adhesive tape shown generally at 62. This tape can be of suitable thickness and adhesion so that it is insured that it will hold the flange 22, by engaging the surface 32 all the way around the chamber 30, with the sharp edge 31 and two-sided tape 62 sealing against the surface 13A to form a tight seal.

In order to enhance the sealing action of edge 31, the free (or rest) shape of the surface 32 of flange 22 is slightly spherical (or it may be conical) as shown by the dotted line in FIG. 2. When flange 22 is deformed to fit the surface of the glass, it stays deformed by action of the two-sided tape 62. This pre-loads sealing edge 31 against the tape (and therefor, the tape against the glass) to assume a good seal. This deformable mounting method also assures a good seal on curved windshield glass since the curvature of glass is generally within the deformable range of flange 22.

The double sided tape 62 can be a suitable commercial adhesive tape. Other ways of fastening the unit in place can be utilized, such as using some type of a temporary sticky adhesive that could later be scraped off, but the double sided adhesive tape is suitable and easy to use.

The reservoir body adapter assembly 42 can be separately injection molded from the main body assembly 21, with the reservoir 52 in place, after which the resin can be placed into the reservoir and then the reservoir sealed at the factory, so that a predetermined and measured amount of resin is available for each repair.

The bull's eye break shown at 16 is generally on an inclined windshield, as shown in FIG. 2. The fixture is made so that it will operate on windshields that are substantially vertical, or tilted down about 60° (30° up from horizontal). The inclination is useful for control of resin flow in the repair process.

The parts are preferably pre-assembled at the factory such that the interior passageways in housing 21 are connected to the reservoir assembly 42 by slipping the sleeve 41 over the nipple 23 and locking the two parts in place with the rib 40 seated into the groove in the sleeve 41. When the break is to be repaired, the raised rib 45 from the line 46 is then forced into place and connected to a suitable vacuum pump. While a valve 47 is shown, the vacuum pump can be connected to hose 46, and then when air pressure is to be used, merely disconnected and the air pressure source, which can comprise a hand pump, can be put into its place.

The housing is placed on the windshield, with the seal cap member 54 still in place, so that the resin is not exposed to the interior bore 43. The fixture 10 is placed as shown in FIG. 2 with the reservoir 52 sloping downwardly, so that the resin tends to flow away from the seal cap member 54. Thus, under gravity, the level of the resin in the reservoir is spaced from the opening 55. A suitable cutting tool 65, which has a sharp cutting edge 66 is inserted into the interior of the sleeve 44 and the seal cap member 54 is sliced off. With the resin 57 spaced from the opening 55, the resin will not escape. The seal cap member then can be removed with the tool. A straight knife can be used to cut the seal cap member and it can be flicked out of the interior passage of the sleeve 44 or may be left loose inside passageway 43 since it is a shape which will not accidentally completely plug up the resin passages. The nipple 46 is then put into place.

With the assembly shown as in FIG. 2, and the seal cap member 54 cut, suitable vacuum is provided through the vacuum pump to act through the passageway 43 to passageway 34, to passageway 35 and into the chamber 30 so that the air space 17 of the break is evacuated through the opening 18.

Before putting the fixture in place by pressing the flange 22 down onto the windshield and using the double sided tape to hold it in place, the air gap 17 can be dried out, to remove water if necessary.

With the break clean, and vacuum applied at a vacuum level that is close to 1/30 of an atmosphere absolute or less, the vacuum is left on to act on the break for a suitable length of time to insure that the air has been removed satisfactorily from the air gap 17. During all this time the resin 57 remains away from the opening 55, as shown in FIG. 2. Also during this time, any gas contained in the resin has an opportunity to escape and be pumped away and thus be at least partially removed.

After the selected length of time for insuring that the air has been satisfactorily removed, for example in the range of 30 seconds to one minute, the resin is released from the reservoir by rotating the reservoir 52 about the axis of connecting nipple 23 to a position wherein gravity will cause the resin 57 to drain through the opening 55 into the passageway 43, and through the passageways 34 and 35 into the resin chamber 30. The resin then will tend to flow into the evacuated air gap 17 through the opening 18. After 10 seconds or so, the vacuum can be released, and atmospheric pressure then acts on the resin to force resin into the gap 17. Valve 47 can be then operated to direct air under pressure from air pressure source to the tube 46 and passageway 43. This air pressure can be in the range of 1 atmosphere absolute up to 10 or 15 atmospheres. A suitable gage can be provided to determine that the pressure is adequate. A hand air pump can be used.

As just described, the break is evacuated before resin reaches the break. This is highly desirable. The reason is that if liquid resin reaches the break earlier, it usually will partly fill the break by action of surface tension and capillary action, trapping air in the break. Surface tension then opposes removal of the trapped air, making its removal much more difficult.

It should be noted that the wall 27 in particular, as well as the rest of the main body 21, can be made of a material that is transparent, and in particular transparent to ultraviolet light, so that ultraviolet cure resins can be used. Having a transparent wall permits easier positioning of the fixture over the break, as well. With pressure still acting on the resin through the tube 46 and through the passageways 34 and 35, to continue to force the resin into the break, an ultraviolet lamp can be placed over the fixture to cure the resin. The ultraviolet lamp can be a standard lamp, and it will be left on a sufficient length of time, for example in the range of two minutes, to cause the resin to cure. This time will vary with the type of resin. Then, the pressure can be relieved, and the fixture housing, the reservoir and other parts can be removed from the windshield, the tube 46 disconnected, and the fixture can be discarded. A razor blade or other tool can be used to remove any tape adhesive from the glass, and the break can be cleaned up by removing excessive resin and smoothing off the surface in a normal manner.

Each break therefore is repaired with a low cost molded fixture that can be easily used, with a preselected amount of resin readily available so that the clean up of the fixture and handling of liquid resin is not necessary. The vacuum source can be a hand vacuum pump, as can the pressure source, and the parts that are in contact with the resin are merely discarded.

It should be noted that the reservoir 52 could be made without the cap member 54 in place, so that a separate capsule or container having a protruding end cap could be slipped into the reservoir with the protruding end passing through the opening into the passageway 43, where it could be cut off with a suitable knife or cutting tool. The capsule could contain a pre-measured amount of resin, made separately from the member 41, and merely slipped into place.

Figure 5:
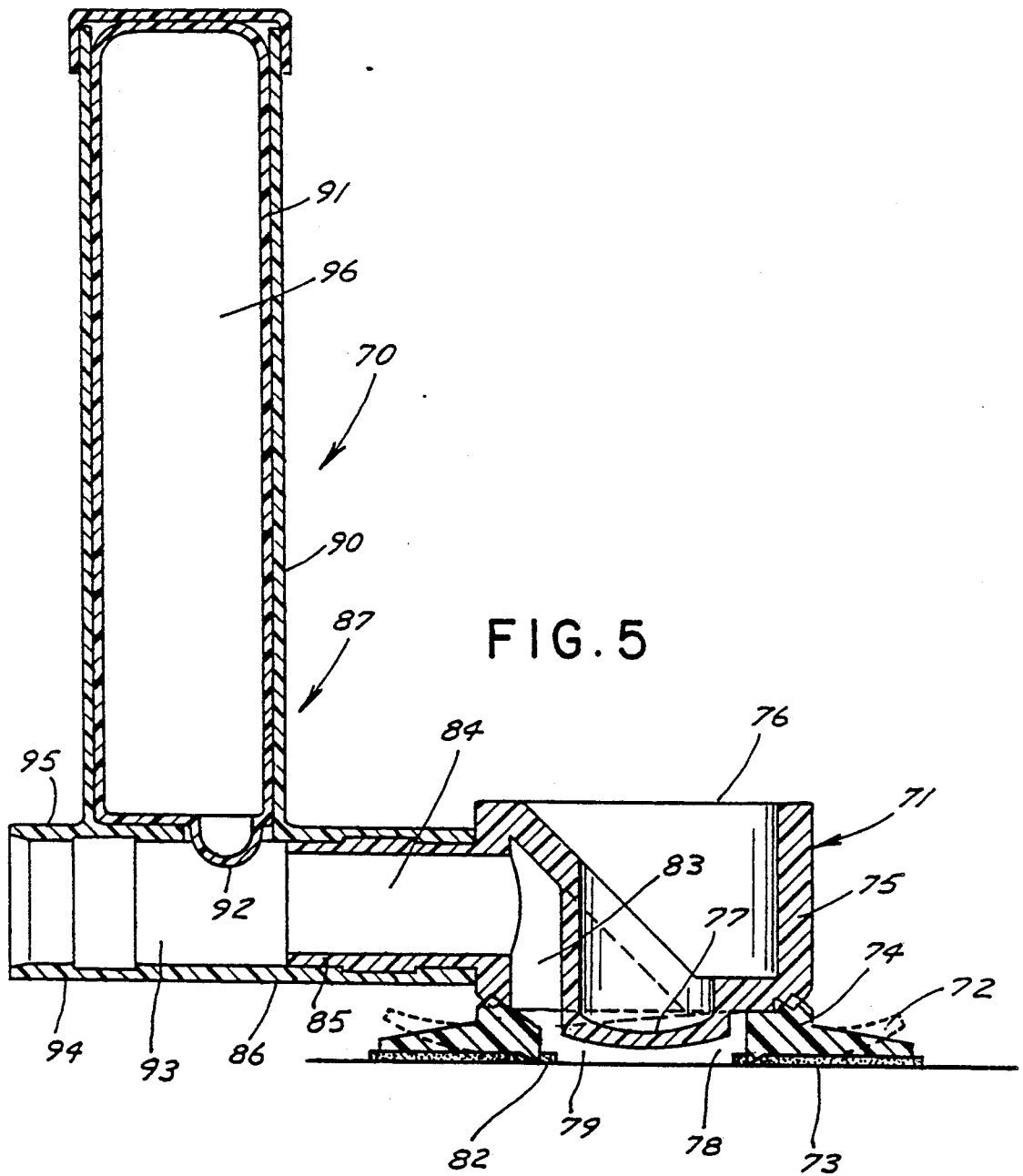
FIG. 5 is a vertical cross sectional view of a modified fixture made according to the present invention.
Figure 6:
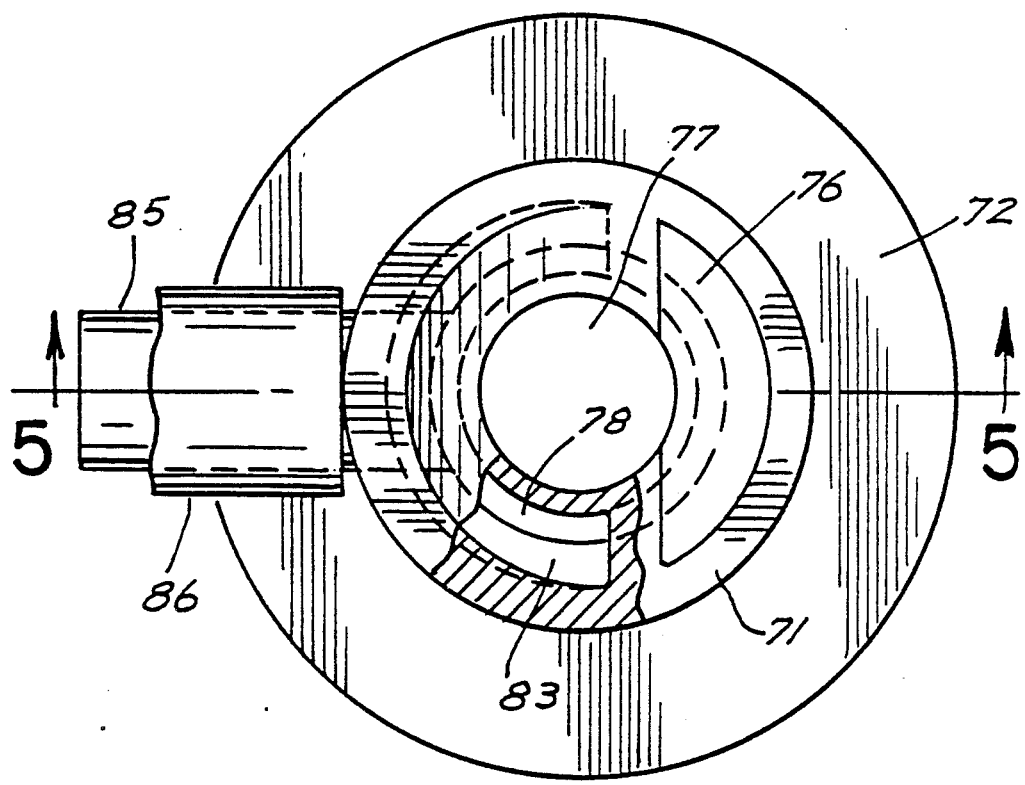
FIG. 6 is a fragmentary top plan view of the fixture of FIG. 5.

Referring to FIGS. 5 and 6, a modified fixture is indicated generally at 70, and it can be formed into two parts that are sonically welded together. A reservoir attachment can also be made so that it can be moved from a storage position to a drain position. This can be done with a flexible connector or tube as well as a rotation joint.

In this form the fixture 70 includes a housing 71, with a support flange 72 at the bottom thereof. The support flange has an undersurface 73 that engages the surface of a windshield having a break to be repaired and is held in position using a double sided adhesive tape as previously explained. The support flange 72 can have a neck 74 thereon, that can be sonically welded onto a main body portion 75 of the injector housing 71. The body portion 75 has an interior recess 76 that is configured to provide a lower wall 77 centered over a resin chamber 78 that is open through a central opening 79 in the flange 72.

The edges of the opening 79 are defined by an annular sealing lip 82 which engages the surface of the windshield and provides a seal. The lip 82 tends to be forced down against the windshield from pressure on the interior of the resin chamber 78. Alternately, the sealing lip, as shown at 31, may be used, in the manner described in connection with FIG. 2. A part annular passageway 83 opens to the chamber 78, and also is open to a passageway 84 in a nipple 85 that is integral with the main body portion 75. The nipple 85 extends laterally from the body. The nipple 85 receives and rotatably retains a sleeve portion 86 of a resin reservoir assembly 87. The resin reservoir assembly in this form of the invention includes body 94 having a reservoir housing 90 thereon that is of size to receive a capsule 91 containing a suitable resin. The capsule 91 has a protruding closure end 92 that protrudes through an opening in the body 94 into a central passageway 93 of the body 94. The reservoir body 94 has a sleeve 95 into which a suitable connector or nipple 45 can be placed leading to a tube 46 as in the previous form of the invention.

The capsule 91 has an interior chamber 96 which contains suitable resin useful for repairing breaks in windshields, and in this form of the invention the reservoir housing can be placed as previously shown in FIG. 2, with the capsule extending downwardly initially, so that resin will remain in the capsule. Then the end cap portion 92 can be cut off with a suitable knife, the nipple 45 put into place in the sleeve 95, and the cycle of repair that was previously explained can be used for repairing breaks in windshields.

The double sided tape indicated at 73A will hold the fixture in place. Sealing lip 82 which surrounds the opening from the resin reservoir 78 will provide a more positive seal relative to the windshield surface to prevent escape of resin or from preventing the resin from spreading.

In this form of the invention, the reservoir assembly 87 can be separately molded from the housing 75, and the capsule 91 also can be separately made. The capsule can be inserted in the reservoir housing for use. The capsule can be held in place with a suitable cap or cover, or made so that it will frictionally fit inside the reservoir housing 90 so that it will remain in place during use and in this case, grease may be used to help assure a leakproof friction fit. As an alternate, capsule 91 may be made of glass or frangible plastic and may be entirely enclosed by chamber 90. The resin may be released by crushing the capsule by deforming chamber 90 with a plier or the like.

When the resin is to be permitted to flow into the channels or passageways 84 and 83 and into the chamber 78, the reservoir housing 90 will be moved to an upright position so that gravity will cause the contents of the capsule 91 to drain into the passageways. The device may be designed, if preferred, without need for a rotary joint on nipple 85. In this case, resin removal is not achieved by rotating the reservoir assembly. Instead, the reservoir housing 90 can be flexible and collapsible, so that a plier or compression tool of some kind can be used for squeezing the housing 90 and the capsule 91 to insure that the resin is injected into the passageways that lead to the break to be repaired.

The bottom wall 77 again is preferably made transparent so the fixture can be readily positioned and centered over a break, as well as permitting UV light transmission for curing resins.

Figure 7:
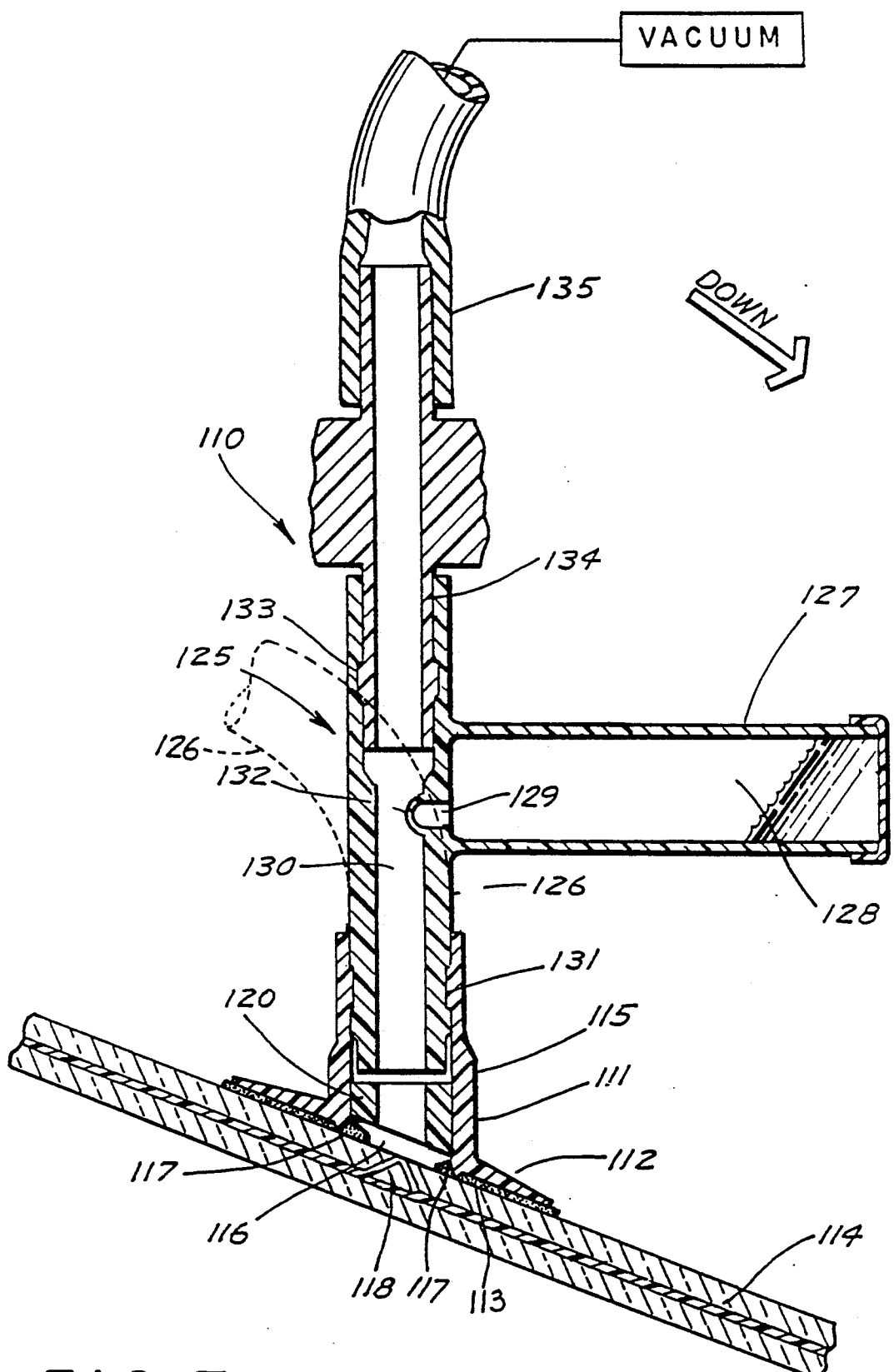
FIG. 7 is a further modified form of a fixture of the present invention.

In FIG. 7, a further modified form of the present invention is shown. Here, fixture 110 includes a support housing 111 that has a support flange 112 around the periphery thereof. This support flange 112 is an annular flange, that has an undersurface 113 that seats onto the surface of a windshield indicated at 114 in a normal manner to repair a bull's eye type break 118 that is illustrated in this windshield. The housing 111 includes a neck 115 that is integral with the flange 112. The flange 112 defines a central opening 116 at the bottom and forms an annular seal lip 117 surrounding the break 118. The seal lip 117 in this form of the invention is urged against the windshield by pressure in the central opening 116. A sleeve 120 is inserted into the neck above the windshield surface, to fill unnecessary volume.

In this form of the invention, a housing indicated at 125 comprises a flexible cylindrical tube 126 that has a lateral reservoir housing 127 formed thereon. The reservoir housing 127 is a cylindrical member that is integral with the tube 126, and has an interior chamber 128 that is open through a passageway 129 to an interior passageway 130 in the tube 126. A hemispherical seal cap member 132 closes passageway 129, and protrudes into the passageway 130. The chamber 128 contains a suitable resin and is then sealed, either by sonically sealing a cover in place, or by pinching or flattening the outer end and sealing the walls, or in some other way providing an adequate seal for normal use.

The lower end of tube 126 slides inside the neck 115 and can be joined to the neck 115 with a rotating joint formed by a recess in the sleeve receiving a rib 131 formed on the interior of the neck 115.

The upper end of the sleeve 126 has a rotating joint lock 133 for a fitting 134 that has an end that slips into the interior of the tube 126. Fitting 134 then can be connected to a suitable tube 135 that leads to either a vacuum pump or to air pressure as desired.

In this form of the invention, the housing 111 and flange 112 can be first centered over the break 118 by observing the position of the housing through the central bore. The flange 112 can then be secured in position with double sided tape, as explained previously. The housing 125 can then be snapped into place in the upper portion of the neck 115, through the rotating coupling as shown. At this point, the opening of the reservoir is facing partly upwardly (note the "down" arrow on the drawing) and the closure cap or end 132 of the resin reservoir is removed so that the passageway 129 is open to the interior resin chamber 128. The resin will not escape into the interior chamber 130 if the flexible tube is not flexed upwardly. The fitting 134 can be snapped into place at the rotating lock joint 133 and vacuum applied to the resin and the break through passageway 130 as previously explained. After the vacuum has been applied for 30 seconds to one minute, the tube 126 can be flexed upwardly as indicated by the dotted lines in FIG. 7 so the reservoir 127 will drain. As an alternate to flexing, the tube also can be rotated to place the reservoir in a drain position. Further, the reservoir 127 can be collapsed with a plier, or compressed manually if sufficient finger force can be generated, so that the resin will be forced from chamber 128, through the opening 129, into the passageway 130, and thus directly down into the resin chamber 117 overlying the break 118 to fill the space or gap left by the cone member of the break.

The vacuum can be released when desired and atmospheric pressure, or greater than atmospheric pressure applied to complete the filling of the gap with resin.

The break 118 will have been dried, and cleaned, prior to placing the housing 111 over the break, as was mentioned in connection with the first form of the invention.

After the gap in the break has filled and while air pressure is maintained, the resin can be cured, again using an ultraviolet light if desired acting through the sides of the fixture and through the sleeve 120. The fixture is removed and then any adhesive tape and excess resin can be removed to finish the break repair.

The reservoir housing 125 and the support housing 111 can be discarded.

In each of the forms of the invention shown for different types of fixtures, the same steps can preferably be used for making the repair. These are, for normal breaks, as follows:

1. Scratch loose glass out of the pit of the break in the break area. If there is water present, it must be removed. The glass cone of the break can be pushed with a scriber or sharp instrument, to help clean out the break.

2. Cut the internal seal member for the resin reservoir with a seal cutter, to open the resin reservoir. The reservoir is maintained in the down position. This keeps the resin from entering the passageways to the break.

3. Attach the fixture to the break, by peeling the release paper from the double sided adhesive tape and aligning the fixture with the break. The window wall at the bottom of the recess in the fixture permits aligning in the first two forms of the invention. The fixture is pressed against the glass, and using a suitable tool, the entire perimeter of the flange is forced against the glass to attach the double sided adhesive tape completely.

4. Evacuate for in the range of 30 seconds, and release the resin by rotating the reservoir to the up position, or by compressing the reservoir to eject the resin or by tilting the reservoir.

5. After 10 seconds, release the vacuum and apply air pressure.

6. With the pressure acting on the resin, place a curing lamp over the injector so that ultraviolet light can pass through the injector and cure the resin.

7. After approximately two minutes, remove the curing lamp, peel off the fixture, and use a razor blade to remove any adhesive that remains on the glass from the adhesive tape used for holding the fixture and then clean up the break with a razor blade in a normal manner. The used fixture is discarded.

8. If the break is not open initially, an external access opening to the break should be drilled. If the break does not repair well, drilling through the glass with a diamond drill in a different location from the original opening into the break gap to fill other areas can be done.

When the procedure is followed, as outlined above, a relatively low cost repair is completed in a minimum time, not only for the actual repair, but also for clean up.

It was explained previously how pressure may be applied to the resin before it is cured and the pressure may be maintained during part, or all of the cure. The cure may be a room temperature cure which is usually rather slow or may be ultraviolet light cure which may be enough quicker to be a valuable time saver. The advantages of curing under pressure with the fixtures we have described, deserve special emphasis.

With the prior art fixtures, if cure is to take place while pressure is maintained, it is necessary to adjust the fixture so that it is forcibly pressing against the glass. Else, there is no seal and pressure cannot be maintained. This force tends to compress the glass (which is slightly flexible) and to bend it inward, displacing some of the repair resin. Then when cure is complete or partly complete and the fixture is removed, tensile stress is common or usual in the resin because the glass tries to return to its free position. In time the bond between resin and glass may fail and cause part of the break to reappear. This is often observed even if the resin is not cured under pressure, presumably due to shrinkage of the resin during cure.

With the present fixture, the fixture supplies an outward force on the glass upon application of pressure during cure. Thus the glass will be slightly bulged outward as a result of hydrostatic pressure of the resin in the break. When cure is complete or partly complete and the fixture is removed, there is a beneficial tendency for the resin to be under compression, since the glass tends to return to its unbulged position. Reappearance of the break is suppressed. This is not the behavior of the glass when prior art fixtures are used together with curing under pressure.

Although the present invention has been described with reference to preferred embodiments, workers skilled in the art will recognize that changes may be made in form and detail without departing from the spirit and scope of the invention.

What is claimed is:

1. A method of repairing small breaks in laminated windshield glass comprising providing a fixture that has an outlet opening;

applying the fixture to the glass with the outlet opening surrounding the break, and sealingly fixing the fixture to the glass;

providing a reservoir for holding repair resin in its liquid state connected to the outlet opening of the fixture and movable between two positions while connected to the outlet opening;

positioning the reservoir in a first position with respect to the outlet opening to prevent escape of the repair resin held therein into the outlet opening;

evacuating the outlet opening and the break while also evacuating the reservoir such that any gases contained in the resin are at least partially removed by the vacuum;

moving at least a portion of the reservoir to a second position with respect to the outlet opening to permit the resin to drain from the reservoir into the outlet opening and into the break under the influence of gravity and draining the resin into the outlet opening and the break while maintaining the vacuum on the outlet opening, the break, and the resin; and removing the vacuum to allow atmospheric pressure to force the resin into the break.

2. The method of claim 1, wherein the reservoir comprises a sealed reservoir, and the method includes the step of cutting the seal to the reservoir to connect the reservoir fluidly to the outlet opening prior to applying the vacuum.

3. The method of claim 1, including the further step of positively applying fluid pressure on the resin in the opening subsequent to the removal of the vacuum.

4. The method of claim 1, wherein the vacuum is applied for a time in the range of 30 seconds before the resin is permitted to drain into the break.

5. The method of claim 1, including the step of cleaning and drying the break prior to placing the fixture with the outlet opening surrounding the break.

6. The method of claim 1 performed on a curved windshield glass including providing a fixture of semi-rigid material, conforming the semi-rigid material to the curved windshield glass, and wherein the steps of sealingly fixing the fixture to the glass comprises sealing the conformed fixture to the curved glass.

7. The method of claim 3 wherein the resin requires a cure time, and the step of positively applying fluid pressure comprises continuing to apply fluid pressure on the repair resin in the opening during at least part of the cure time for the resin.

8. The method of claim 1 including the step of mounting the reservoir to portions of the fixture spaced from the outlet opening after resin has been added to the reservoir, and wherein the step of moving the reservoir comprises rotating the reservoir about a rotatable fluid coupling to permit the resin to drain into the outlet opening.

9. The method of claim 1 wherein the reservoir is mounted directly adjacent to a cylindrical passageway leading to the outlet opening, the reservoir having a seal protruding into the passageway, and the method further including the step of passing a cylindrical cutter through the passageway to cut the reservoir seal and fluidly open the reservoir to the passageway and the outlet opening prior to applying the vacuum.

10. The method of claim 9 wherein the reservoir comprises a separate sealed capsule and an outer chamber, and the method further comprises a step of inserting the separate sealed capsule with an end portion extending into the passageway prior to the step of cutting the seal.

11. A method of repairing breaks in laminated windshield glass comprising a fixture that has a housing with a passageway therein, and an outlet opening leading from the passageway and comprising the steps of:

sealingly applying the fixture to the glass with the opening in the fixture surrounding the break;

providing a rotatable sealing connection for mounting a reservoir on the fixture, wherein the step of sealingly applying the fixture to the glass includes positioning the rotatable sealing connection above the opening in the fixture;

providing a reservoir rotatably mounted to the rotatable sealing connection, the reservoir having an outlet leading to the passageway in the housing;

providing a volume of resin in the reservoir;

rotating the reservoir to a first position wherein the resin is moved away from the passageway leading to the opening in the fixture to prevent escape of the resin from the reservoir under gravity;

applying a vacuum to the passageway in the housing to evacuate the opening, the break, and the reservoir such that any gases contained in the resin are at least partially removed by the vacuum;

rotating the reservoir to a second position to permit the resin to drain under the influence of gravity through the outlet and passageway into the opening and to the break and draining the resin while maintaining the resin, the break, the opening, the outlet, and the passageway under vacuum; and removing the vacuum to allow the resin to be moved into the break.

12. The method of claim 11, including the further step of applying a fluid pressure on the resin in the outlet opening subsequent to removal of the vacuum.

13. The method of claim 12, including the further step of providing a reservoir having a filling of resin and having a seal over the outlet protruding into the passageway, and removing the seal prior to the vacuum applying step.

14. The method of claim 13 wherein the seal is completely removed from the passageway prior to permitting the vacuum to be applied to the reservoir.

* * * * *

UNITED STATES PATENT AND TRADEMARK OFFICE
CERTIFICATE OF CORRECTION

PATENT NO. : 5,069,836

DATED : December 3, 1991

INVENTOR(S) : Frank D. Werner

It is certified that error appears in the above-identified patent and that said Letters Patent is hereby corrected as shown below:

Title page:

In the References Cited Section, insert the following:

OTHER PUBLICATIONS

Loctite Bullseye Windshield Repair Kit Brochure, published 1983, by Loctite Corporation Signed and Sealed this Thirteenth Day of April, 1993

Attest:

STEPHEN G. KUNIN

Attesting Officer

Acting Commissioner of Patents and Trademarks